May 6, 1958   D. G. BENSON   2,833,343
ATTACHMENT FOR SAFETY STRAP FOR AUTOMOBILES
Filed Oct. 14, 1955
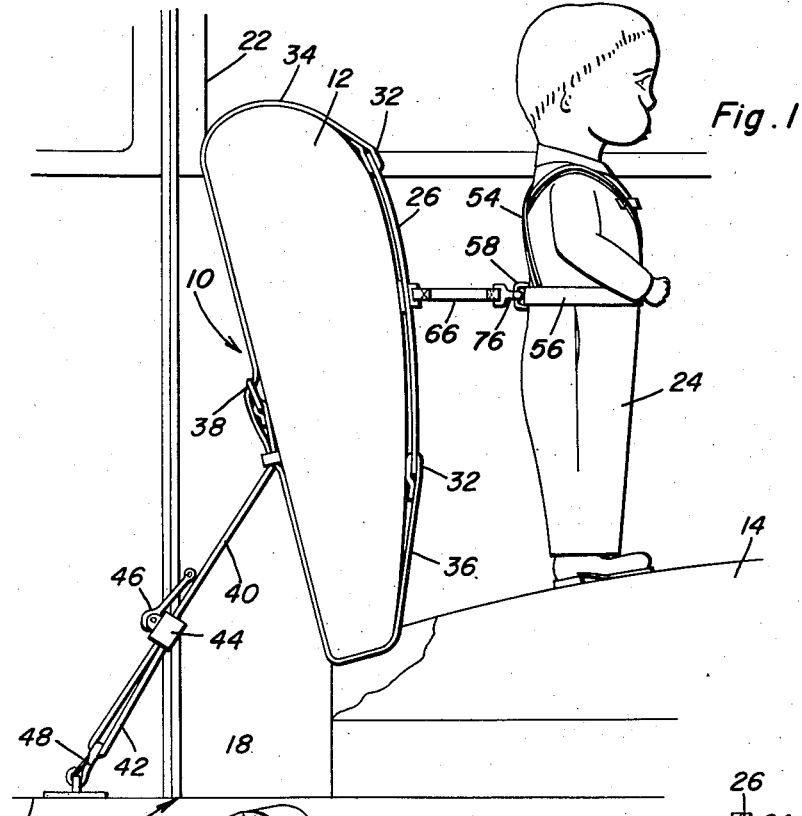
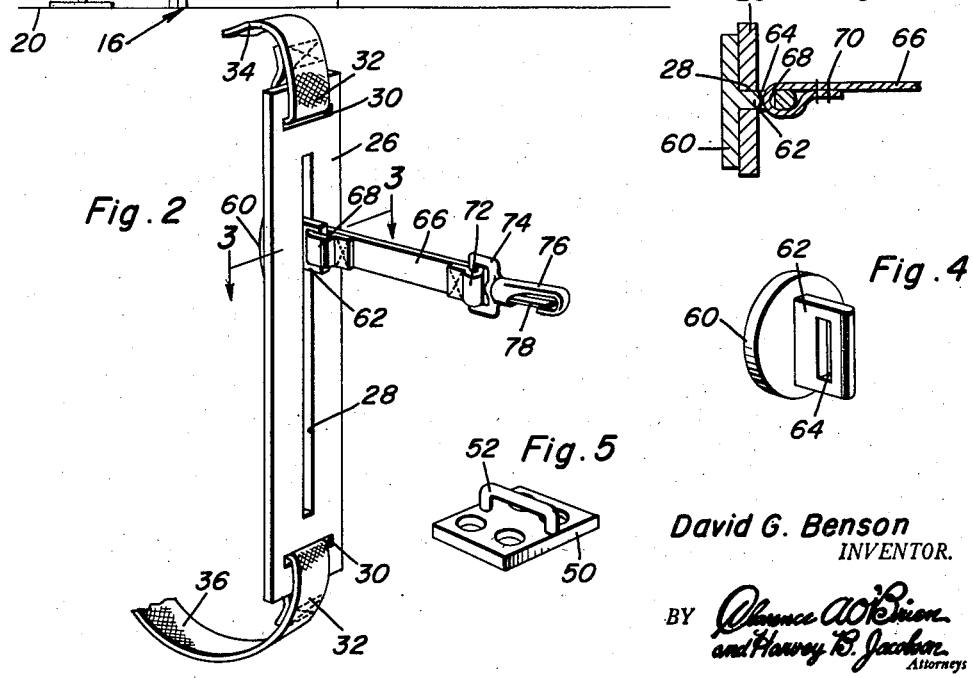
David G. Benson
INVENTOR.

United States Patent Office 2,833,343
Patented May 6, 1958

2,833,343

ATTACHMENT FOR SAFETY STRAP FOR AUTOMOBILES

David G. Benson, Easton, Md.

Application October 14, 1955, Serial No. 540,396

4 Claims. (Cl. 155—189)

This invention generally relates to a safety device and more specifically provides an attachment for an automotive vehicle in the form of a safety strap extending from a harness worn by a small child to an attaching strap mounted in encircling relation to the back of a seat conventionally provided in automotive vehicles.

It has been found that a major number of injuries due to accidents and near accidents when the automotive vehicle comes to a sudden stop is caused by the occupants of the vehicle being thrown forwardly against the relatively hard dashboard or associated areas of the vehicle. Some development has been made in the employment of safety straps for adults which extend in encircling relation to the adults substantially at the waist for retaining them in the seat. However, a large number of injuries are caused to small children positioned on a vehicle wherein the children are not aware of dangers caused by sudden stopping. Notoriously, small children will play and move about the interior of the vehicle and especially wish to observe the area outside of a vehicle. This results in small children standing on the bottom of the seat wherein they are extremely susceptible to being thrown against the dashboard or the associated area of a vehicle upon sudden stopping thereof which may be caused by sudden application of brakes or collision with another object. Accordingly, it is the primary object of the present invention to provide a safety device which may be employed for stopping small children from being thrown forwardly and yet permitting relative freedom of movement of the children wherein the safety device will not be objectionable to them.

Another object of the present invention is to provide a safety strap including a vertically disposed plate having a vertical slot therein slidably receiving a retaining strap detachably engaged with a child's harness wherein the attachment strap and plate may be retained on the vehicle with very little discomfort to adult persons occupying the seat.

A further object of the present invention is to provide a safety strap attachment which may be employed for either four door or two door passenger vehicles inasmuch as it is provided with an optional tiedown for retaining the tilting seats employed in two door vehicles in substantially a vertical position.

Other important objects of the present invention will reside in its simplicity of construction, ease of operation, adaptation for its particular purposes, ease of assembly and disassembly, and relative low cost of manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the safety strap attachment for vehicles of the present invention illustrating the relationship of the various elements of the invention to the portions of a vehicle and also to the small child;

Figure 2 is an enlarged perspective view of the plate supported against the front of the back of a seat;

Figure 3 is a detailed sectional view taken substantially upon a plane passing along section line 3—3 of Figure 2 illustrating the construction of the slidable disc with the projecting loop thereon;

Figure 4 is a perspective view of the slidable disc with the loop thereon which projects through the slot in the mounting plate; and Figure 5 is a perspective view of the floor plate with an upstanding loop thereon for detachably receiving the snap hook on the extension of the seat strap for retaining the tilting back of a vehicle seat in substantial vertical position.

Referring now specifically to the drawings, the numeral 10 generally designates the attachment of the present invention which is adapted to be positioned on the back 12 of a vehicle seat 14 which is disposed within a vehicle generally designated by the numeral 16 which includes an access door 18, a floor 20 and the usual windows 22 and dashboard (not shown). As illustrated, a small child 24 is positioned on the top of the seat 14 in standing position and the child 24 would be susceptible to being thrown forwardly against the dashboard if the vehicle 16 were brought to a sudden stop or rapidly decelerated inasmuch as the child 24 is normally positioned on the right hand side of the vehicle where there is no provision for a hand hold.

The strap attachment 10 generally includes a vertically elongated flat plate 26 having a vertically elongated slot 28 centrally disposed therein. Adjacent each end of the plate 26 is a transverse slot 30 for receiving the loop end 32 of a pair of strap members 34 and 36. The strap members 34 and 36 pass over the upper edge and under the lower edge of the back 12 of the seat 14 and are secured together at their free ends by a buckle 38 thereby securing the plate 26 securely against the front surface of the back 12 of the seat 14. The plate 26 may be constructed of any suitable sheet material such as sheet metal but is preferably constructed of relatively light and inexpensive plastic material which may be tinted in any suitable color and is sufficiently strong for the purposes involved. The buckle 38 may be of any suitable construction and may or may not be of the quick release type since it is not necessary for the plate 26 to be removed very often after it has been installed on a vehicle 16.

The strap 34 is provided with an extension 40 which has a looped or reversely bent portion 42 at its free end that is attached to a slidable member 44 mounted in encircling relation to the extension 40 and provided with a cam lock 46 wherein the length of the loop portion 42 may be easily adjusted. Positioned in the loop portion 42 is a snap hook 48 wherein movement of the member 44 will adjust the position of the snap hook 48.

A floor plate 50 is provided which is mounted on the floor 20 of the vehicle 16 and has an upstanding loop 52 thereon for engagement with the snap hook 48. Engagement of the snap hook 48 with the loop 52 will effectively retain the back 12 of the seat 14 in vertical position. This feature of the invention permits the use of the device with a two door vehicle which normally has forwardly pivotal sectional back members provided on the front seat thereof. If the device is to be utilized with a four door vehicle or a vehicle having rigid seat backs, the extension 40 and the other associated elements may be omitted.

The child 24 is provided with a harness 54 having a waist strap 56 with a D-ring 58 movably mounted thereon. A slidable disc 60 is disposed behind the plate and is provided with a projection 62 thereon which extends through the slot 28 and is provided with a transverse slot 64 wherein the projection 62 and the slot 64 form a loop projecting through the slot 28 in the plate 26. A strap 56 having a loop 68 at one end is attached to the projection 62 permanently by stitching 70 which forms the loop 68. The other end of the strap 56 is provided with a loop 72 which is attached to the eye portion 74 of a snap hook 76 that is provided with an entrance spring 78 which permits entrance of a portion of the D-ring 58 into the hook 76 and then prevents accidental disengagement thereof until finger pressure is exerted against the spring 78.

In operation, the snap hook 76 may be engaged with the D-ring 58 and easily disengaged therefrom to permit the safety device to be readily attached to the small child 24. This greatly facilitates and enhances the safety feature of the present invention inasmuch as very little time is consumed in attaching the safety device to the apparel or harness 54 of the child 24. Additionally, the vertical slot 28 in the plate 26 and the slidable disc 60 with the projection 62 extending through the slot 28 permits the small child to either sit down or stand up or be positioned in any desired vertical position and the flexibility of the strap 66 permits lateral movement of the child 24 but still prevents the child 24 from being thrown forwardly against other portions of the vehicle. Inasmuch as the entire device is substantially flat against the seat back 12, it will not be necessary to remove the attachment for ordinary operation of the vehicle. Also, the construction of the cam lock 46 and the snap hook 48 permits ready detachment of the snap hook 48 from the floor plate 50 thereby permitting operation of the tilting seat back 12 in the usual manner to provide access to the rear of the vehicle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A safety device for use in passenger conveying vehicles having a seat with a generally vertically disposed back for preventing a child disposed on the seat from being thrown against other portions of the vehicle in the event of sudden stopping of the vehicle, said device comprising a plate member disposed vertically against the forward surface of the back of the seat, a strap encircling the back of the seat for maintaining the plate member in position, said plate member having an elongated slot therein, a disc slidably disposed behind the plate member, a projecting loop on said disc extending through the slot, a flexible member attached to said loop, and means on the free end of said flexible member for detachable engagement with a portion of a child's apparel, said strap including a pair of members having free ends adjustably secured together by buckle means, one of said free ends extending beyond the buckle means and having a hook thereon, a floor plate with a loop thereon secured to the floor of a vehicle for receiving said hook, said plate being disposed rearwardly of the seat for preventing forward tilting of the back of the seat.

2. A safety device for use in passenger conveying vehicles having a seat with a generally vertically disposed back for preventing a child disposed on the seat from being thrown against other portions of the vehicle in the event of sudden stopping of the vehicle, said device comprising a plate member disposed vertically against the forward surface of the back of the seat, a strap encircling the back of the seat for maintaining the plate member in position, said plate member having an elongated slot therein, a disc slidably disposed behind the plate member, a projecting loop on said disc extending through the slot, a flexible member attached to said loop, and means on the free end of said flexible member for detachable engagement with a portion of a child's apparel, said flexible member being in the form of a strap member with a snap hook on the free end thereof for engagement with a ring on the belt of a harness worn by a small child, said strap including a pair of members having free ends adjustably secured together by buckle means, one of said free ends extending beyond the buckle means and having a hook thereon, a floor plate with a loop thereon secured to the floor of a vehicle for receiving said hooks, said plate being disposed rearwardly of the seat for preventing forward tilting of the back of the seat.

3. A safety device for automobiles comprising an elongated plate, means for attaching the plate to the front surface of the back of a seat, a strap adapted to engage a portion of the apparel of a small child, and means adjustably mounting the strap on said plate to permit freedom of movement of the child, said plate attaching means including a strap encircling the back of a seat, an extension on one end of said last-named strap, an adjustable snap hook on the end of the extension, a floor plate mounted rearwardly of the back of the seat, an upstanding loop on the floor plate for receiving said snap hook thereby preventing forward tilting of the back of the seat.

4. A safety device for an occupant of a vehicle seat having a bottom and a back rest portion for holding the occupant adjacent the front surface of the back rest portion of the seat upon rapid deceleration of the vehicle during forward travel thereof, said device comprising an elongated slotted mounting member disposed against the forward surface of the back rest portion of the seat, strap means encircling the back rest portion of the seat and being attached to the mounting member for anchoring the mounting member on the back rest portion of the seat, bracket means slidably disposed between the front surface of the back rest portion of the seat and the mounting member whereby the bracket means will be normally retained in adjusted position and may be disengaged from the mounting member, a flexible member connected with said bracket means and extending forwardly therefrom, the free end of said flexible member having a snap hook thereon for detachable engagement with a harness on the occupant thereby permitting limited movement of the occupant, the bracket means including a portion extending through the slot therein for limiting the movement of the bracket means and the flexible member thereby extending the freedom of movement of the occupant, said mounting member being in the form of a flat thin plate whereby an occupant leaning backward against the same will suffer very little discomfort.

References Cited in the file of this patent

UNITED STATES PATENTS

| 1,712,198 | Clapp | May 7, 1929 |
| 2,288,692 | Fearson | July 7, 1942 |
| 2,351,749 | Elmer | June 20, 1944 |
| 2,664,140 | Kindelberger | Dec. 29, 1953 |
| 2,685,331 | Gauntlett et al. | Aug. 3, 1954 |
| 2,695,052 | Yates et al. | Nov. 23, 1954 |
| 2,705,044 | Nolen | Mar. 29, 1955 |

OTHER REFERENCES

Mechanix Illustrated, vol. 48, No. 6, April 1953.